United States Patent [19]
Chu

[11] Patent Number: 5,519,625
[45] Date of Patent: May 21, 1996

[54] SYSTEM FOR CHARACTERIZING PHASE-MODULATED SIGNALS USING A TIME INTERVAL ANALYZER

[75] Inventor: David C. Chu, Woodside, Calif.

[73] Assignee: Hewlett-Packard Company, Palo Alto, Calif.

[21] Appl. No.: 197,424

[22] Filed: Feb. 16, 1994

[51] Int. Cl.$^6$ .................................................. G01R 23/00
[52] U.S. Cl. ........................ 364/481; 364/484; 327/9
[58] Field of Search ........................ 364/485, 486, 364/487, 481, 484; 375/269, 271, 272, 273, 226, 302, 328; 327/9, 3; 348/499; 324/76, 58

[56] References Cited

U.S. PATENT DOCUMENTS

| | | | |
|---|---|---|---|
| 3,592,961 | 7/1971 | Grace | 348/499 |
| 4,581,749 | 4/1986 | Carney et al. | 375/302 |
| 4,773,083 | 9/1988 | Baumback et al. | 375/328 |
| 5,001,724 | 3/1991 | Birgehheier et al. | 375/226 |
| 5,264,802 | 11/1993 | Beg et al. | 327/3 |
| 5,319,569 | 6/1994 | Nichols et al. | 364/487 |

OTHER PUBLICATIONS

Hewlett–Packard Journal, Feb. 1989, USA, vol. 40, No. 1, ISSN 0018–1153, pp. 28–35; D.C. Chu: "Phase Digitizing: A New Method for Capturing and Analyzing Spread–Spectrum Signals".

Hewlett–Packard Jounal, Feb. 1989, USA, vol. 40, No. 1, ISSN 0018–1153, pp. 35–41, Paul S. Stephenson, "Frequency and Time Interval Analyzer Measurement Hardware".

Birgenheier, "Measuring the Modulation Accuracy of π/4 DQPSK Signals for Digital Cellular Transmitters", *Hewlett–Packard Journal*, Apr. 1991, vol. 42, No. 2.

*Primary Examiner*—Emanuel T. Voeltz
*Assistant Examiner*—Thomas Peeso

[57] ABSTRACT

A system for characterizing phase modulated signals, e.g., π/4 DQPSK signals, includes a time interval analyzer coupled to a system processor for determining a variety of signal characterizing parameters as a function of readings made on a phase modulated signal by the analyzer. The system processor includes a phase/frequency determining section for generating a phase deviation curve and decoding the modulated signal. The system processor further includes a processing section for determining various signal defining parameters including origin offset and I/Q mismatch as a function of the phase deviation.

18 Claims, 6 Drawing Sheets

Fig. 3

| SAMPLE # | TIME (ns) | CYCLE # |
|---|---|---|
| 1 | 00.30 | 0 |
| 2 | 100.25 | 8 |
| 3 | 200.35 | 16 |
| 4 | 300.25 | 24 |
| 5 | 400.30 | 32 |
| 6 | 500.40 | 40 |
| 7 | 600.35 | 48 |
| 8 | 700.40 | 56 |
| 9 | 800.45 | 64 |
| ----- | ----- | ----- |
| 1024 | 10234560 | 8184 |

| TABLE OF ERRORS FOR I/Q MISMATCH | | | | |
|---|---|---|---|---|
| k | $V_k$ | $\beta_k V_k \Theta_k$ | $\Theta_k$ | $\beta_k \Theta_k$ |
| 0 | 0 | 0 | j | 0 |
| 1 | $jh\delta$ | $\delta/2$ | $(-1+j)h$ | $(-1+j)h\delta/2$ |
| 2 | $j\delta$ | 0 | $-1$ | 0 |
| 3 | $jh\delta$ | $-\delta/2$ | $(-1-j)h$ | $(-1-j)h\delta/2$ |
| 4 | 0 | 0 | $-j$ | 0 |
| 5 | $-jh\delta$ | $\delta/2$ | $(1-j)h$ | $(1-j)h\delta/2$ |
| 6 | $-j\delta$ | 0 | 1 | 0 |
| 7 | $-jh\delta$ | $-\delta/2$ | $(1+j)h$ | $(1+j)h\delta/2$ |

SYSTEM FOR CHARACTERIZING PHASE-MODULATED SIGNALS USING A TIME INTERVAL ANALYZER

FIELD OF THE INVENTION

This invention relates to data transmission and communication and, more particularly, to a system for characterizing phase-modulated signals using a time interval analyzer. The system uses output from the time interval analyzer to determine phase deviation. The phase deviation is then processed by the system to obtain a variety of other signal-characterizing parameters.

BACKGROUND

Modern modulation schemes, such as π/4 DQPSK and MSK, impose deliberate phase and frequency changes on a carrier to transmit data. In π/4 DQPSK modulation, for example, two-bit data words, or symbols, sequentially produce one of four instantaneous phase shifts to modulate the carrier. A 00 data word causes a +45 degree phase change, a 01 causes a +135 degree change, a 10 causes a –45 degree change, and a 11 causes a –135 degree change. When demodulating, each switch in phase produces a symbol.

Because of these phase changes, it is often difficult to measure important parameters, such as the frequency of the carrier signal, that are useful in the design of modern cellular radio systems and classification of radio transmissions. The difficulty arises because the zero-crossings of the signal are shifted by the phase modulation. Depending on the modulating data, the number of zero-crossings in a given time is often different from what would be seen on an unmodulated carrier, thus making it difficult to accurately determine the unmodulated carrier frequency.

Existing systems for determining carrier frequency in phase-modulated signals suffer either from inaccuracy or relative complexity. Measuring devices such as frequency counters are relatively simple, but often produce inaccurate results. Because these devices measure average frequency by counting the number of cycles in a given time, they produce results that fluctuate randomly—and often significantly—around the true carrier frequency, if modulation is present.

Other relatively more complex systems exist that accurately measure carrier frequency and other signal-characterizing parameters by first determining phase deviation and then using the phase deviation to determine the other parameters. One such system is disclosed in an article by Raymond A. Birgenheier entitled, "Measuring the Modulation Accuracy of π/4 DQPSK Signals for Digital Cellular Transmitters", appearing in the *Hewlett-Packard Journal*, April 1991, Vol. 42, No. 2. The system receives as input a π/4 DQPSK phase-modulated signal and digitizes its amplitude as a function of time using analog-to-digital conversion. There must be a minimum of several samples per cycle using this method. These uniformly spaced components are treated as the in-phase components of the signal. The signal is then passed through a Hilbert transformer to derive the quadrature components of the signal. Phase is obtained by taking the arctangent of the quadrature signal divided by the in-phase signal and magnitude is obtained by computing the square root of the sum of the in-phase signal and quadrature signal. Once both phase and magnitude are determined, a variety of other signal-characterizing parameters can be obtained.

Based on the foregoing, one skilled in the art would prefer a system that provides accurate information for characterizing phase-modulated signals, but involves a relatively less complex phase determination technique that requires sampling commensurate with the modulation bandwidth.

BRIEF SUMMARY OF THE INVENTION

There is, therefore, provided in a presently preferred embodiment of the present invention, a system for characterizing phase-modulated signals using a time interval analyzer. The system employs a method for directly determining phase deviation including the step of sampling the modulated signal to produce a series of time stamps and cycle stamps indicative of the time and number of zero-crossings of the modulated signal. A phase deviation curve is then generated as a function of the time stamps and an estimated average frequency. Once obtained, the phase deviation curve can be used in the processing section of the system to determine a variety of signal characterizing parameters. The present system requires sampling commensurate with the modulation bandwidth which sometimes means one sample in many cycles, rather than several samples per cycle.

BRIEF DESCRIPTION OF THE DRAWINGS

These and other features of the present invention will be better understood with reference to the following detailed description when considered in conjunction with the following drawings wherein.

DETAILED DESCRIPTION

Figure 1:
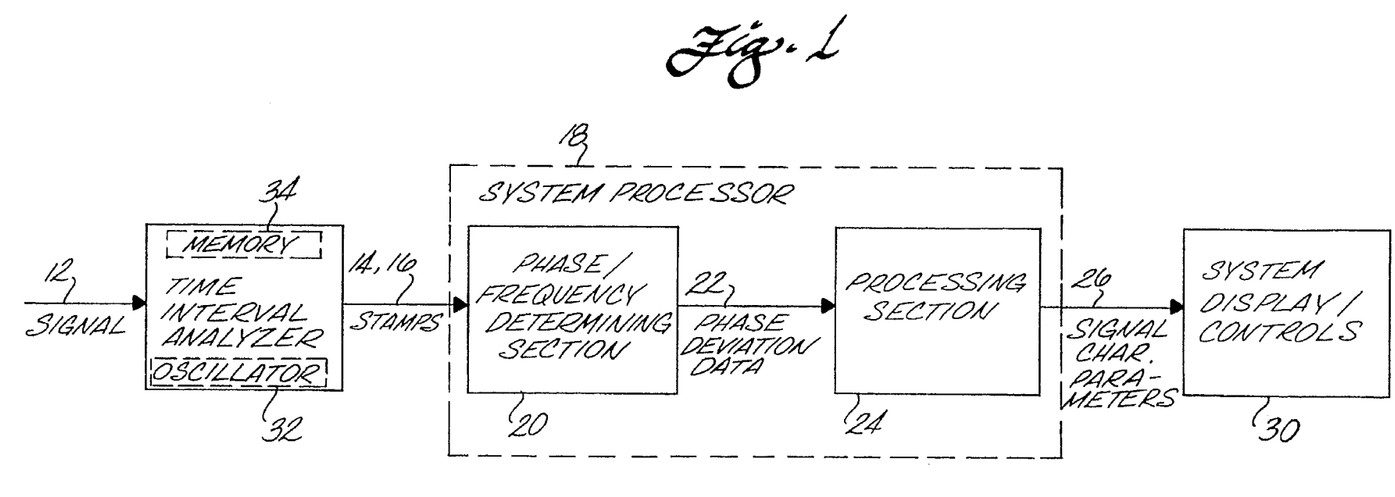
FIG. 1 is a generalized block representation of a system for characterizing phase-modulated signals using a time interval analyzer.

Referring to FIG. 1, the system for characterizing phase-modulated signals according to the present invention includes a time interval analyzer 10, also called a time digitizer, or time-stamping device for receiving an input modulated signal 12 and outputting a series of stamps 14, 16 indicative of the zero-crossings of the signal. The stamps are delivered to a system processor 18 which includes a phase/frequency determining section 20 for determining phase and frequency deviation data as a function of the stamps. The phase deviation data 22 is then sent to the processing section 24 of the processor for determining a variety of other signal-characterizing parameters 26. Finally, the signal-characterizing parameters are used or displayed in system display/controls 30.

In operation, the time interval analyzer 10 sequentially samples to high-precision selected zero-crossings of the modulated signal and produces a series of time stamps 14 and cycle stamps 16. By time-stamping, it is meant that the analyzer samples the modulated signal, locates at least selected zero-crossings (positive, negative, or both) of the signal, and records the time of occurrence of the zero-crossings against a highly accurate built-in reference time base oscillator 32. By cycle stamping, it is meant that the analyzer identifies and counts the number of zero-crossings that occur within a user-defined cycle time. As they are produced, the time stamps and cycle stamps are temporarily stored in memory 34 within the analyzer before being downloaded to the phase/frequency determining section.

A suitable time interval analyzer for use in the present system is commercially available from Hewlett-Packard Co., Palo Alto, Calif., under the product name, HP53310. This analyzer has a built-in reference oscillator that typically produces time stamps accurate to within 100 picoseconds of the actual zero-crossings. The device also includes user-defined controls for setting the sampling size, sample selection, and sampling rate. For example, the device can be controlled to selectively sample the positive or negative zero-crossings or both. The sampling rate can be controlled based on a user-defined pace setting or cycle time. Pace is one method of controlling the sampling rate by having the device count a specific number of zero-crossings between samples. The sampling rate can also be regulated on a time basis, e.g., by a user-defined cycle time during which the device is enabled to sample data after a set time interval.

Figure 2:
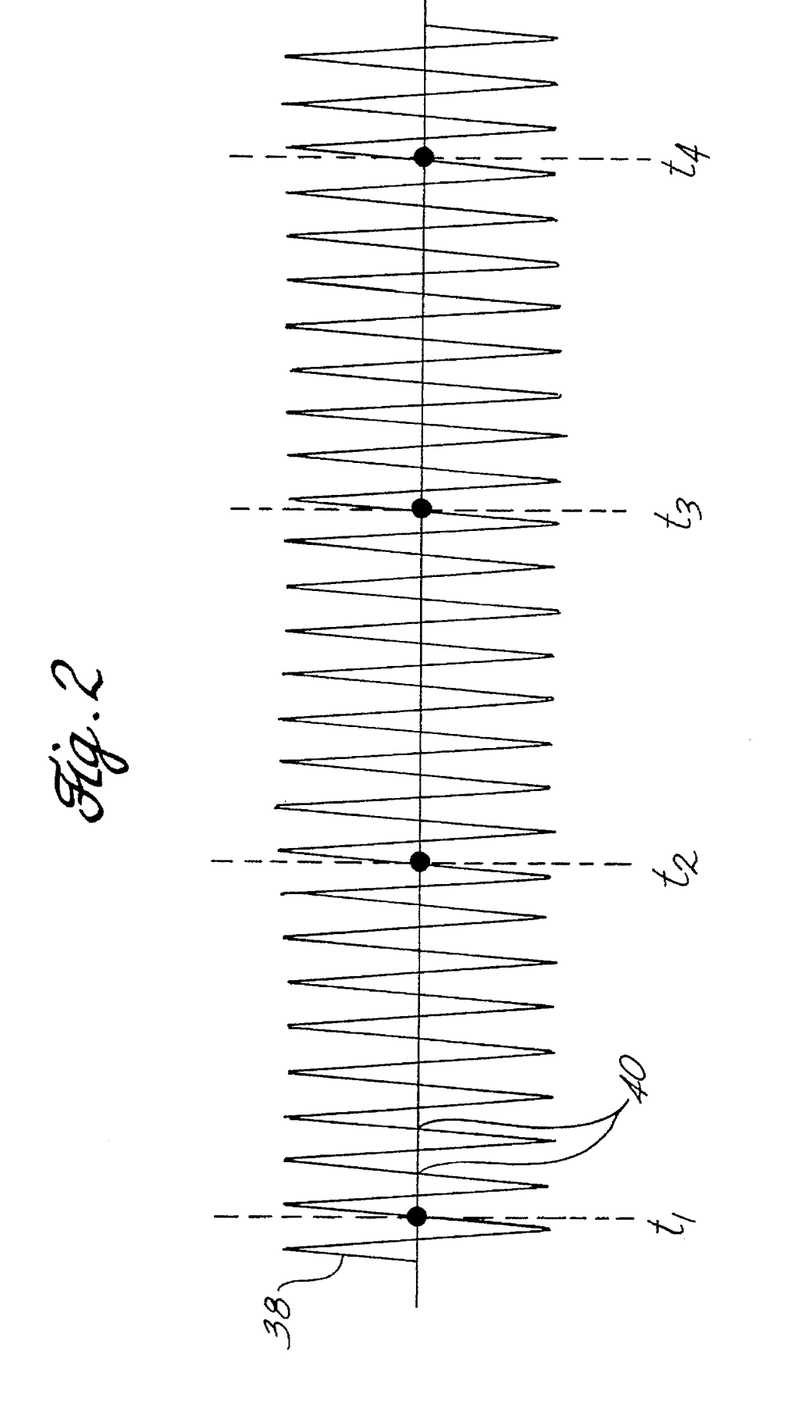
FIG. 2 is a graphical representation of exemplary operation of the time interval analyzer of FIG. 1.
Figure 3:
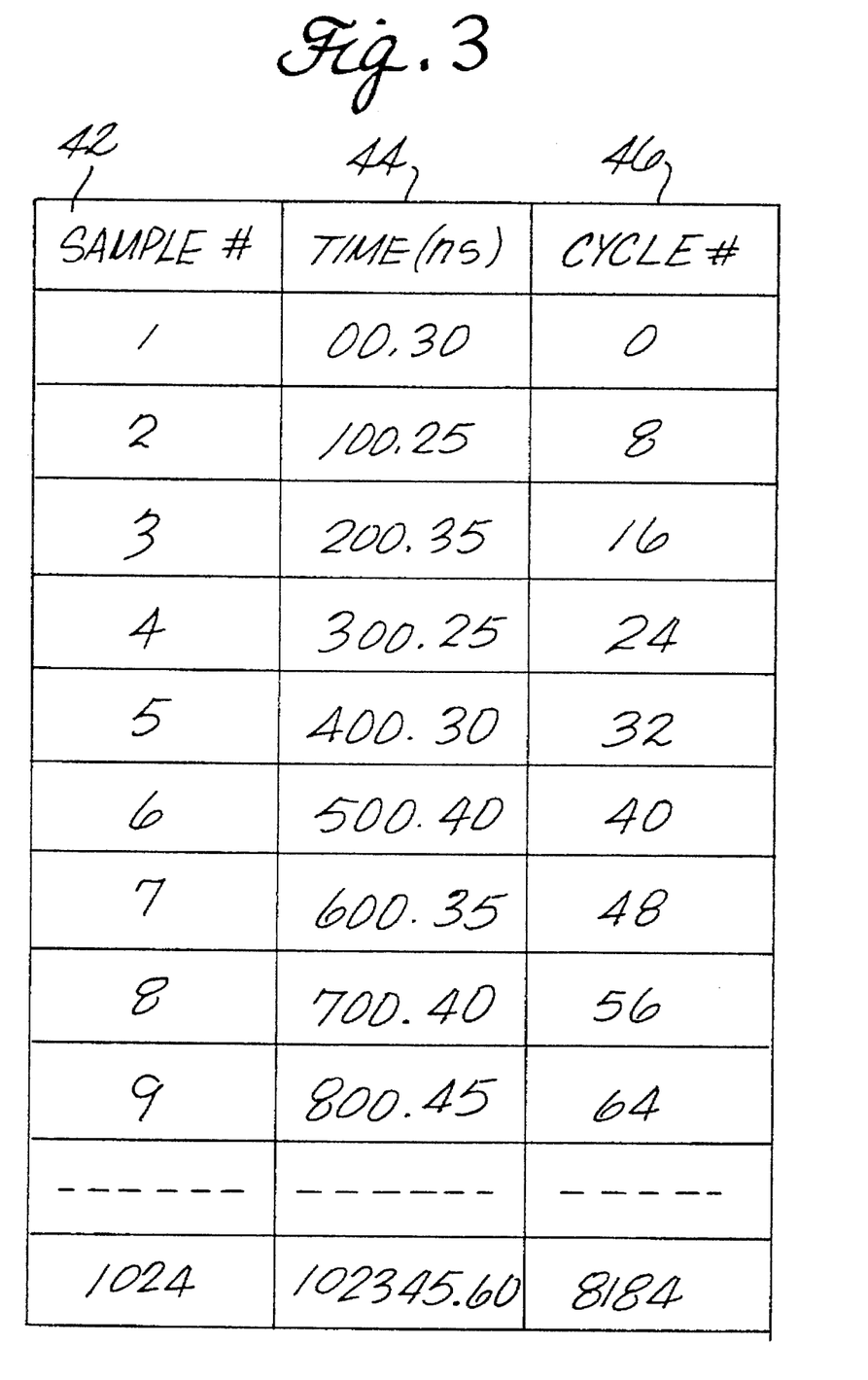
FIG. 3 is a tabular representation of time stamp and cycle stamp data collected during exemplary operation of the time interval analyzer.

Referring to FIG. 2, in exemplary operation, the time interval analyzer captures timing information from a simple sine wave 38. In this example, the analyzer is programmed by a user to time-stamp every eighth positive zero-crossing 40 of the wave occurring at times t1, t2, t3, and t4. Typical results of the time-stamping process are shown in the table of FIG. 3. The sample number 42, indicative of the number of times the analyzer has time stamped the signal, ranges from one to the user-defined sample size (in this case 1024). The time stamp readings 44 are set based on the reference oscillator within the analyzer. The cycle numbers 46, or cycle stamp readings, indicate the total number of zero-crossings (in this case, positive crossings) that have occurred at each corresponding sample.

Figure 4:
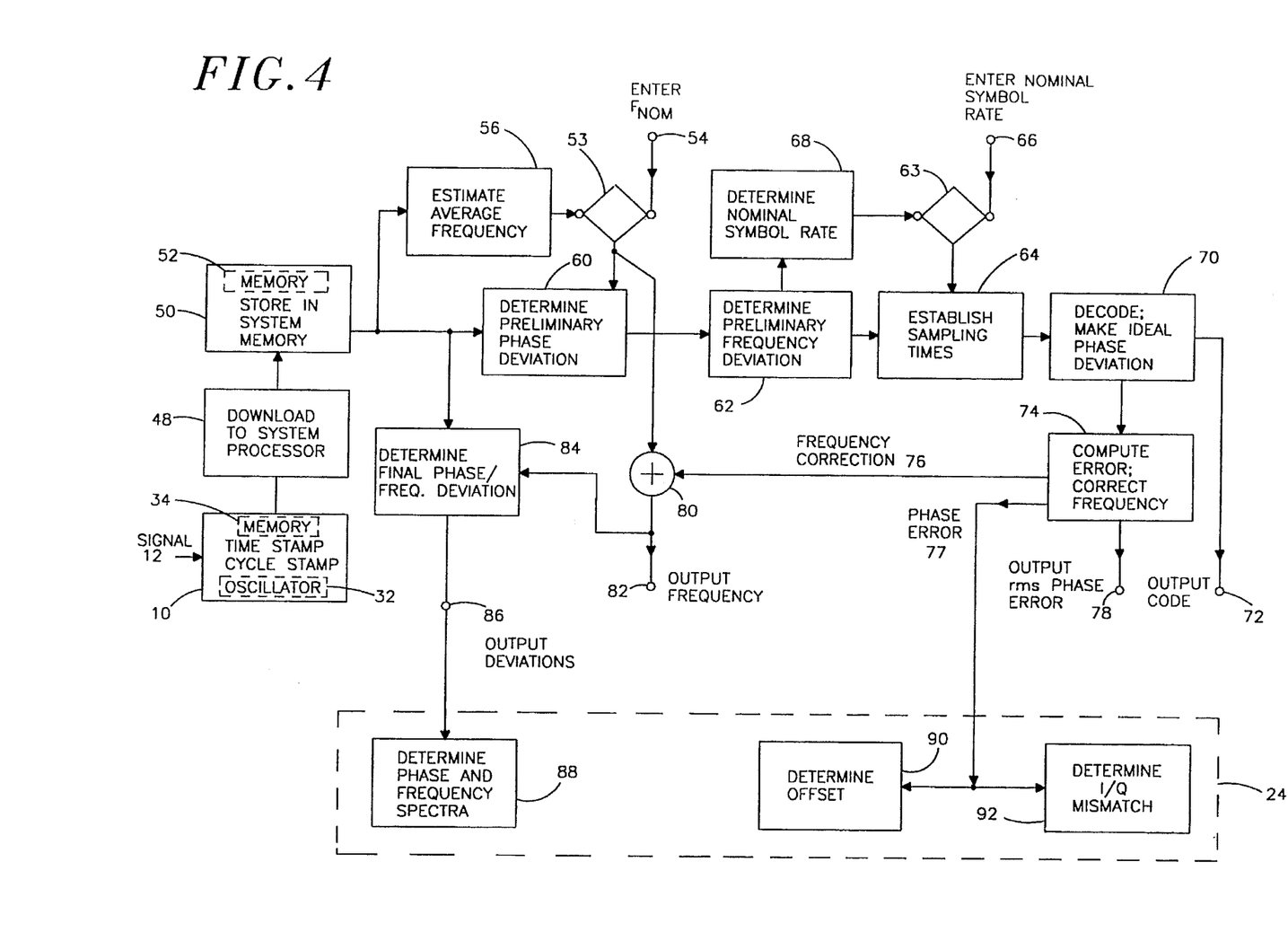
FIG. 4 is a block representation of the phase/frequency determining section of FIG. 1.

Referring to FIG. 4, a π/4 DQPSK modulated signal 12, nominally at 825.03 MHz in this example, is input into the time interval analyzer 10. The analyzer is set, using an internal local oscillator at 823 MHz to down convert the input signal, thereby producing an intermediate frequency (IF) of 2.03 MHz. The IF is chosen for balance between good phase resolution and sampling time control (the lower the IF the better the resolution, the higher the IF the better the control). The pace is set at 14 so that the analyzer samples the signal at about 145 kHz. In other words, the system takes one sample for every 14 cycles. This is a significant benefit over existing systems that typically require several samples per cycle. The sample size is selected to be 1024, meaning that a block of 1024 time stamps are collected. Based on the settings, the analyzer time-stamps and cycle-stamps the signal to high precision and collects the stamps in internal memory 34. The cycle stamps are uniform and need not be explicitly stored.

Upon completion of the analyzing operation, or concurrently therewith, the stamp data stored in the analyzer is downloaded in block 50 to the phase/frequency determining section 20 of the system processor 18 (FIG. 1) The system processor may be, for example, a software-driven programmable digital computer, such as a PC. A GPIB interface card (not shown), commercially available from Hewlett-Packard Co. under the product name HP8235B is suitable for downloading the data into the system processor memory 52.

The phase/frequency determining section employs an estimated frequency in addition to the stamps, to generate a phase deviation curve. The estimated frequency may be input to the section through one of a variety of methods. In one suitable method, a user inputs a nominal frequency through input 54. A nominal frequency is necessary to produce a phase deviation curve sufficiently accurate such that the differences between adjacent symbol times can be mapped correctly into ±45 degrees or ±135 degrees. In an alternative method, the system processor automatically estimates the average frequency in system block 56 as a function of the time stamps and cycle stamps stored in the system memory. The user may choose between which method is used through decision block 53.

The system processor uses one of at least two alternative methods to automatically estimate the average frequency. In the first method, the frequency is estimated by dividing the total cycle count by the total time. The total cycle count is obtained by subtracting the first cycle count from the last cycle count; the total time is obtained by subtracting the first time stamp from the last time stamp. This estimate may not be highly accurate. However, the estimate at this point is subject to correction in later parts of the system and need not be highly accurate at this time.

In the alternative, however, if desired, a more accurate estimate of the signal frequency is obtained by applying a least squares fit over the cycle and time columns of the data compiled for the signal. The regression produces a straight line fit $e_{fit}$ vs. t, set forth as follows:

$$e_{fit}(i) = e_o + f_o \cdot t_i \qquad (I)$$

where $e_o$ is a constant derived from the regression curve fit, $t_i$ is the reference time at which a stamp was taken, and $f_o$ is the estimated frequency from the curve fit.

Depending on the modulation on the signal, the slope of the fit has been found to be a good approximation of the signal frequency. If the signal is a stable, unmodulated clock, for example, and the error in the approximation is entirely due to the round-off error in each measurement, the regression method has been found to estimate the frequency to better than 0.05 ppm (4 Hz) in a relatively short measurement time of 102 microseconds. In the case of a signal subject to heavy phase modulation, the least squares fit is not significantly better than the other methods of approximation. As mentioned, however, great accuracy is not required at this time.

Given the frequency estimated by any suitable method, preliminary phase deviation is determined in system block 60 as a function of the estimated average frequency. In particular, phase deviation at time $t_i$ is determined as follows:

$$\text{Phase deviation at } t_i = e_i - e_{fit}(i) \qquad (II)$$

where $e_i$ signifies the cycle number, and $e_{fit}(i)$ represents the value of the curve fit at i. Using formula (II), a preliminary phase deviation curve can be calculated over the reference time stamp values. A preliminary frequency deviation curve can be constructed in system block 62 by differentiating the phase curve.

The frequency deviation curve shows many instances when the function exhibits sharp positive and negative peaks (local maxima and minima) or spikes. These are the points where the modulation switches from one sampling point to the next.

If a nominal symbol rate is known, $R_{nom}$, then the actual symbol rate can be precisely determined. To determine the actual rate, an array of symbol numbers is first constructed from an array of M local maxima and minima of the frequency deviation function. The array of local maxima and minima can be denoted as mx(i), where i goes from 1 to M. It is not necessary to collect all switching points since some are not very distinct. The process aims to fit an integral number of symbols $\Delta z(i)$ between two adjacent maxima/minima (treated alike) mx(i) and mx(i+1). The number $\Delta z(i)$ is computed as follows:

$$\Delta z(i) = \text{INT}[(mx(i+1) - mx(i)) \cdot R_{nom} + 0.5] \quad \text{(III.A)}$$

where the function INT(x) is the largest integer less than or equal to x. This is done for all mx(i). The collection of $\Delta z(i)$ so obtained is added sequentially, starting with a z(1)=0 as follows:

$$z(i+1) = \sum_{k=1}^{i} \Delta z(k) \quad \text{(III.B)}$$

A linear regression can be made on the two arrays mx(i) and z(i) to give an optimum function:

$$z_{opt}(i) = a + b \cdot mx(i) \quad \text{(III.C)}$$

where the slope parameter "b" is the symbol rate, and the parameter "a" the ideal y-intercept.

The nominal symbol rate $R_{nom}$ may be obtained in at least two ways. It may be entered in input 66, or it may be established by performing a transform (FFT) of the absolute value of the frequency deviation in block 62 and observed for a significant response. The user may choose between these two ways in decision block 63.

Once the rate "b" is established, the symbol times s(k) are obtained by evaluating at t-values giving "half" integer values of $z_{opt}$, i.e., $z_{opt}$=1.5, 2.5, 3.5, etc.

$$s(i) = \frac{i + \frac{1}{2} - a}{b} \quad \text{(III.D)}$$

If the rate $R_{nom}$ is known to be very accurate, then the linear regression may be used to estimate only the parameter "a", i.e., $$z_{opt}(i) = a + R_{nom} \cdot mx(i), \quad \text{(III.E)}$$

and the sampling times s(i) are given by $$s(i) = \frac{i + \frac{1}{2} - a}{R_{nom}} \quad \text{(III.F)}$$

where i goes from 1 to all symbols, not just M.

Once sampling times are established by any of the above suitable methods, the system generates an ideal discrete phase deviation curve in block 70. To establish the ideal curve, the preliminary phase deviation is sampled at the established sampling times using any suitable interpolation technique, such as cubic spline. The measured phase change from one symbol to the next can be found by subtraction. The consecutive phase changes are rounded off to the nearest of the four allowable discrete phase values used in the $\pi/4$ DQPSK modulation scheme, i.e., +45 degrees, −45 degrees, +135 degrees, and −135 degrees. The determination of phase changes proceeds, one symbol at a time, until all symbols are processed. Then, these discrete phase changes are sequentially summed to produce the ideal phase deviation curve.

The ideal curve can be used to decode the $\pi/4$ DQPSK signal in system block 70 in accordance with the following key:

+45 degrees=00
−45 degrees=10
+135 degrees=01
−135 degrees=11

The resulting code can be outputted, if desired, at output 72.

In system block 74, the ideal phase deviation curve is compared to the preliminary phase deviation curve at the sampling points to compute the residual phase error. The phase errors (which can be determined for each symbol) are produced at output 77. The phase errors can be used later to determine signal characterizing parameters in the processing section 24 of the system. The root mean square of the phase error (rms phase error) is output at processor output. The rms phase error is an overall estimate of the phase error in one number.

The original estimated frequency is typically not a good approximation of the carrier frequency in the presence of $\pi/4$ DQPSK modulation because the methods for determining the original estimate fail to take into account the precise effect of the modulation. Comparison between the ideal phase deviation plot and the preliminary phase deviation plot yields the necessary information to determine the frequency correction. In addition block 80, the frequency correction is combined with the preliminary frequency estimate from block 56 or input 54 to produce an accurate measured carrier frequency that can be outputted at system output 82. In practice, the error in the measured frequency at output 82 has been found to be less than 1 Hz in 7 ms. This is significantly less than the error approaching 1 kHz typically found in the average frequency estimate block 56.

The ideal frequency is also used by the processor to determine a final phase/frequency deviation at system block 84. The phase deviation is determined relative to the original time and cycle stamps stored in system memory 52. Final frequency deviation is determined by differentiating the final phase deviation. Both are outputted at system output 86 to the processing section 24 1) for determining signal-characterizing parameters such as, for example, frequency and phase spectra using FFT analysis in block 88.

The processing section 24 also uses the phase error calculations 77 from block 74 to determine signal-characterizing parameters including origin offset (block 90) and in-phase/quadrature (I/Q) mismatch (block 92). Origin offset results from leakage in the multiplier of the I/Q modulator used for $\pi/4$ DQPSK modulation. I/Q mismatch results from a mismatch between the I and Q channels of the modulator which manifests itself in an ellipse in the resulting constellation. Both of these parameters are duly measurable using the present invention. The origin offset is expressible as a percentage of the average modulation. The mismatch is also expressible in a similar manner.

Figure 5:
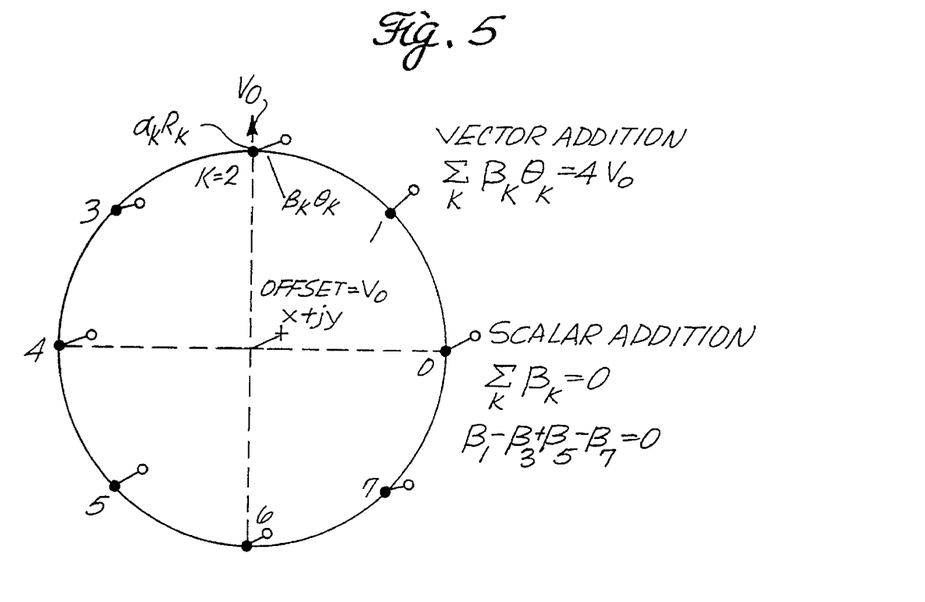
FIG. 5 is a vector diagram showing the method for determining origin offset within the processing section of FIG. 1.

Referring to FIG. 5, a vector diagram illustrates a method used in the processing section for determining origin offset in percent relative to the modulation and in the proper direction without the need for a modulus input. Assuming the radius of the vector unit circle is one, the offset is represented by the vector:

$$V_o = x + jy \quad \text{(IV)}$$

where $V_o$ represents the origin offset error vector, and x and y are normalized. The radial unit vector $R_k$ at the kth node is represented by the vector:

$$R_k = e^{jk\pi/4} = \cos k\pi/4 + j \sin k\pi/4 \quad \text{(V)}$$

The tangential unit vector at the kth node is represented by the vector:

$$\theta_k = j R_k = -\sin k\pi/4 + j \cos k\pi/4 \quad (VI)$$

The error vector $V_o$, universal for all nodes, manifests itself at the kth node as a phase error which is the projection of $V_o$ onto the tangential unit vector, and a magnitude error which is a corresponding projection onto the radial vector $R_k$. Accordingly, $V_o$ can be decomposed into the following vector:

$$V_o = x + jy = \alpha_k R_k + \beta_k \theta_k \quad (VII)$$

where $\alpha_k R_k$ is the radial component of $V_o$ and $\beta_k \Theta_k$ is the tangential component of $V_o$ at the kth node; $\alpha_k$ and $\beta_k$ are real.

The real numbers $\alpha_k$ and $\beta_k$ can be solved in terms of x and y, resulting in the following set of equations:

$$\alpha_k = x \cdot \cos k\pi/4 + y \cdot \sin k\pi/4 \quad (VIII)$$

$$\beta_k = x \cdot \sin k\pi/4 + y \cdot \cos k\pi/4 \quad (IX)$$

The tangential component of the error vector $V_o$ at the kth node, $\beta_k \Theta_k$, is given by:

$$\beta_k \theta_k = (-x \sin k\pi/4 + y \cos k\pi/4) \cdot (-\sin k\pi/4 + j \cos k\pi/4) \quad (X)$$

This tangential or phase component is determined through the phase deviation output 86 (FIG. 4) from the phase/frequency determining section of the system.

If all eight phase error vectors, one from each node, are added together vectorially, the following occurs:

$$\sum_{k=0}^{7} \beta_k \theta_k = \quad (XI)$$

$$\sum_{k=1}^{8} \left( -x \cdot \sin \frac{k\pi}{4} + y \cdot \cos \frac{k\pi}{4} \right) \cdot \left( -\sin \frac{k\pi}{4} \right) +$$

$$j \sum_{k=1}^{8} \left( -x \cdot \sin \frac{k\pi}{4} + y \cdot \cos \frac{k\pi}{4} \right) \cdot \cos \frac{k\pi}{4} =$$

$$\sum_{k=0}^{7} jy \cdot \cos \frac{k\pi}{4} \cos \frac{k\pi}{4} + x \cdot \sin \frac{k\pi}{4} \sin \frac{k\pi}{4} +$$

$$(-y - jx) \cos \frac{k\pi}{4} \sin \frac{k\pi}{4} = 4(x + jy) =$$

$$4 \times \text{the offset vector } V_o$$

because:

$$\sum_{k=0}^{7} \left[ \sin \left( \frac{k\pi}{4} \right) \right]^2 = \sum_{k=1}^{8} \left[ \cos \left( \frac{k\pi}{4} \right) \right]^2 = 4; \quad (XII)$$

and $$\sum_{k=1}^{8} \left[ \sin \left( \frac{k\pi}{4} \right) \cos \left( \frac{k\pi}{4} \right) \right]^2 = 0 \quad (XIII)$$

Equation (XI) demonstrates that adding all eight errors vectorially produces four times the offset vector.

In practice, the average phase error evaluated at each node is used for $\beta_k \Theta_k$.

The linear regression used in the phase frequency determining section does not affect the offset determination because the net scalar sum of the phase errors due to origin offset equals zero. The scalar phase error at node k due to the offset $V_o$ is the modulus of $\beta_k \Theta_k$, or simply $\beta_k$. Accordingly:

$$|\beta_k \theta_k| = \beta_k = -x \sin \frac{k\pi}{4} + y \cos \frac{k\pi}{4} \quad (XIV)$$

The sum of all eight $\beta_k$ values is zero since:

$$\sum_{k=1}^{8} \left[ \sin \left( \frac{k\pi}{4} \right) \right] = \sum_{k=1}^{8} \left[ \cos \left( \frac{k\pi}{4} \right) \right] = 0 \quad (XV)$$

Based on the foregoing, the processing section determines origin offset as a function of the phase component of the error vectors. The most effective way is to add all eight averaged phase errors vectorially and divide by four.

Figure 6:
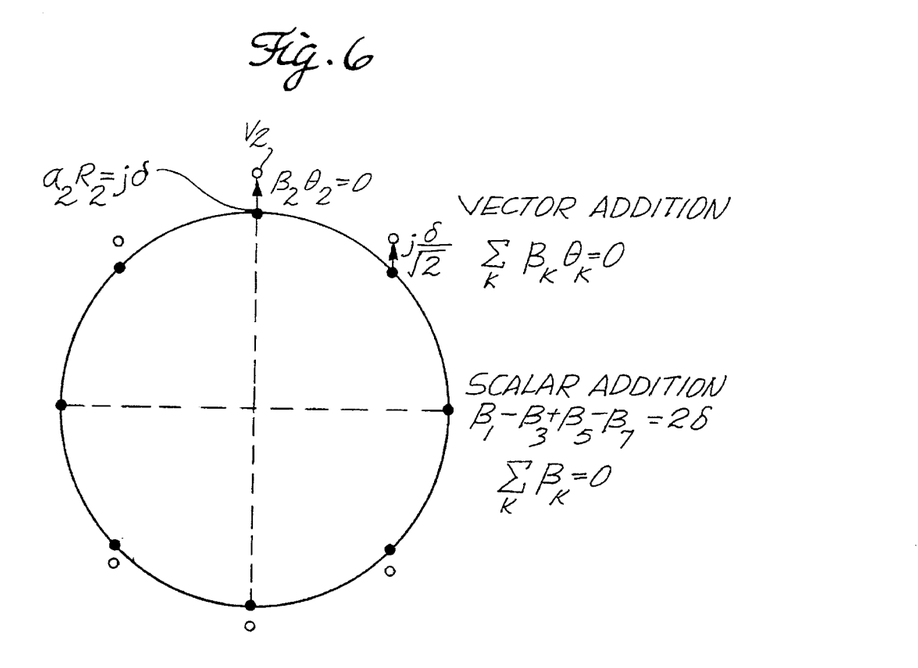
FIG. 6 is a vector diagram showing the method for determining I/Q mismatch within the processing section.

Referring to FIG. 6, in addition to origin offset, the processing section 24 (FIG. 1) measures I/Q mismatch in percent relative to modulation.

Assuming the radius of the vector unit circle is one, then:

$$I = 1 \quad (XVI)$$

$$Q = 1 + \delta \quad (XVII)$$

$$h = \frac{1}{\sqrt{2}} \quad (XVIII)$$

The error vectors are caused by the elongated Q-vector:

$$V_o = 0; V_1 = jh\delta; V_3 = jh\delta; V_4 = 0; V_5 = -jh\delta; V_6 = -j\delta; V_7 = -jh\delta \quad (XIX)$$

As above, the tangential unit vector at the kth node is:

$$\theta_k = j R_k = \sin k\pi/4 + j \cos k\pi/4 \quad (VI)$$

Figure 7:
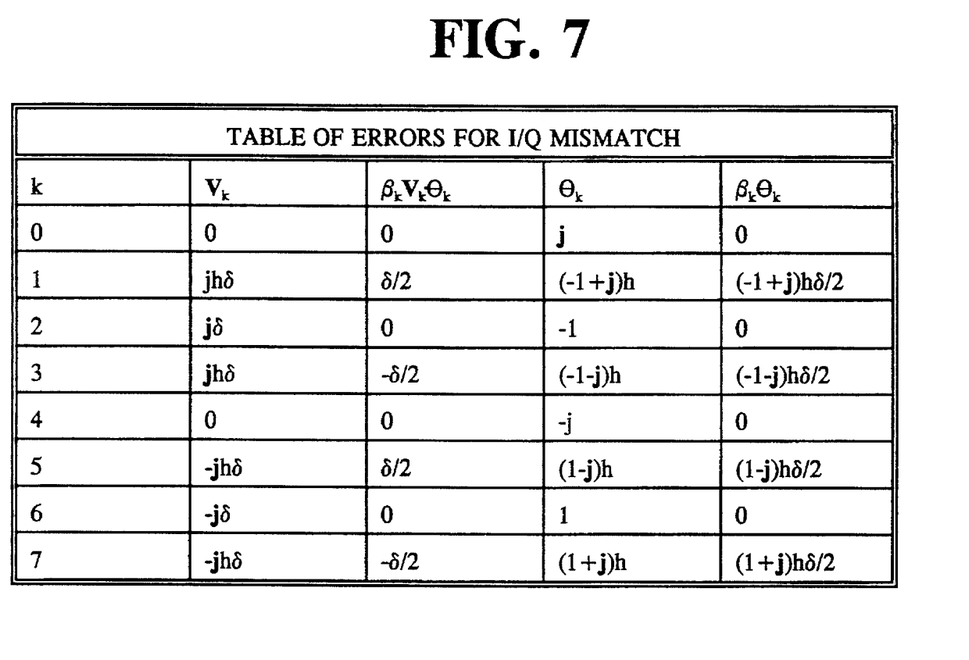
FIG. 7 is a tabular representation of error readings used in the method of determining I/Q mismatch.

The projection of $V_k$ onto $\Theta_k$ is $\beta_k$, the scalar phase angle. The vector phase error is $\beta_k \Theta_k$. These values are computed and tabulated FIG. 7.

The phase/frequency deviation determining section cannot measure $V_k$. However, $\beta_k$ can be measured. Recalling that $V_k$ can be broken down into tangential and radial components:

$$V_k = x + jy = \alpha k R_k + \beta_k \Theta_k \quad (VII)$$

In formula (VII), $\alpha_k$ and $\beta_k$ are real.

As mentioned above, only the tangential or phase-component $\beta_k \Theta_k$ is measurable. The mismatch $\delta$ may be obtained by combining four scalar phase deviation values $\beta_k$ as follows:

$$\beta_1 - \beta_3 + \beta_5 - \beta_7 = 2\delta \quad (XX)$$

where $\delta$ = the mismatch. Therefore, the mismatch can be calculated in the processing section as a function of the phase deviation output from the phase/frequency duration determining section.

The two measurements, offset and mismatch, are orthogonal. In other words, the presence of one will not affect the other in the computation. Specifically, $$\beta_1 - \beta_3 + \beta_5 - \beta_7 = 2\delta \text{ (due to mismatch)} \quad (XXI)$$

$$\beta_1 - \beta_3 + \beta_5 - \beta_7 = 0 \text{ (due to offset).} \quad (XXII)$$

Also, $$\sum_{k=0}^{7} \beta_k \theta_k = 0 \text{ for mismatch, but} \quad (XXIII)$$

$$\sum_{k=0}^{7} \beta_k \theta_k = V_o \text{ for offset} \quad (XXIV)$$

Just as in the offset case, the algebraic sum of the $\beta_k$ values is zero, i.e.

$$\sum_{k=0}^{7} \beta_k = 0 \text{ for mismatch.} \quad \text{(XXV)}$$

Therefore, the linear regression process also will not affect a mismatch measurement.

It is possible to measure origin offset and I/Q mismatch using the present system when both are present at the same time. Summing all phase error components vectorially yields four times the offset, and summing four phase error vectors algebraically as $\beta_1-\beta_3-\beta_5-\beta_7$ yields twice the mismatch.

The system as described has additional benefits other than sampling commensurate with the modulation bandwidth. For example, since samples take place at signal zero-crossings, when the signal is not present, no samples are taken. Therefore, in the case of burst-type signals, all of the samples take place inside the burst, thereby providing an efficient means of using samples. Also, because the present system measures phase directly, it avoids the complexity of converting voltage vs. time data to phase vs. time data.

While the invention has been described and illustrated with reference to specific embodiments, those skilled in the art will recognize that modifications and variations may be made with departing from the principles of the invention. For example, although described in the context of characterizing π/4 DQPSK modulated signals, the invention can be tailored to characterize other phase and frequency modulated signals. When applied to other frequency and phase modulation, only the rule for constructing the ideal phase deviation function need be different. All other processes need not be changed.

What is claimed is:

1. A method for characterizing a modulated signal comprising the steps of:
   sampling the modulated signal to produce a plurality of time stamps and cycle stamps;
   estimating the average frequency of an unmodulated carrier signal as a function of the time stamps and cycle stamps;
   determining the phase deviation of the modulated signal as a function of the time stamps and estimated average frequency.

2. The method of claim 1 further comprising the step of displaying the determined phase deviation curve.

3. A method for characterizing a modulated signal comprising the steps of:
   sampling the modulated signal to produce a plurality of time stamps;
   estimating the average frequency of an unmodulated carrier signal; and
   determining the phase deviation of the modulated signal as a function of the time stamps and estimated average frequency,
   the phase deviation determining step further comprising the steps of:
      generating a preliminary phase deviation curve;
      differentiating the preliminary phase deviation curve to determine a preliminary frequency deviation curve;
      identifying points of local maxima and minima of the preliminary frequency deviation curve; and
      determining sampling points for sampling the preliminary phase deviation curve as a function of the preliminary frequency deviation curve and local maxima and minima.

4. A method for characterizing a modulated signal comprising the steps of:
   sampling the modulated signal to produce a plurality of time stamps;
   inputting the time stamps into a processor;
   estimating the average frequency of an unmodulated carrier signal; and
   determining the phase deviation of the modulated signal as a function of the time stamps and estimated average frequency,
   the phase deviation determining step further comprising the steps of:
      generating a preliminary phase deviation curve as a function of the time stamps and estimated average frequency;
      entering a symbol rate into the processor;
      establishing sampling points as a function of the symbol rate; and
      sampling the preliminary phase deviation curve at the sampling points.

5. The method of claim 4 further comprising the steps of:
   keying the sampled phase deviation curves to recover predefined modulation values;
   generating an ideal phase deviation curve by sequentially summing the recovered predefined modulation values; and
   decoding the modulated signal by reading the idealized phase deviation curve.

6. The method of claim 5 further comprising the steps of computing phase error by comparing the idealized phase deviation curve with the preliminary phase deviation curve at the sampling points.

7. The method of claim 4 further comprising the steps of:
   recovering predefined modulation values by mapping measured phase deviation values at sampling points to ideal modulation values;
   generating an ideal phase deviation curve by sequentially summing the recovered predefined modulation values;
   determining a frequency correction by comparing the ideal phase deviation curve with the preliminary phase deviation curve; and
   determining carrier frequency by adding the frequency correction to the estimated average frequency.

8. A method for characterizing a modulated signal comprising the steps of:
   sampling the modulated signal to produce a plurality of time stamps;
   estimating the average frequency of an unmodulated carrier signal;
   determining the phase deviation of the modulated signal as a function of the time stamps and estimated average frequency;
   determining phase error components as a function of the determined phase deviation;
   summing the phase error components vectorially; and
   determining origin offset as a function of the summed phase error components.

9. A method for characterizing a modulated signal comprising the steps of:
   sampling the modulated signal to produce a plurality of time stamps;
   estimating the average frequency of an unmodulated carrier signal;
   determining the phase deviation of the modulated signal as a function of the time stamps and estimated average frequency;

determining phase error components as a function of the determined phase deviation; and summing the phase error components algebraically and determining the I/Q mismatch as a function of the summed phase error components.

10. A method for characterizing modulated signals comprising the steps of:

inputting a modulated signal into a time interval analyzer;

identifying and recording the time and number of selected zero-crossings of the signal using the time interval analyzer;

downloading the recorded time and number of zero-crossings into a system processor; and processing the recorded time and number of zero-crossings for generating a phase deviation curve.

11. The method of claim 10 wherein the inputting step comprises inputting a $\pi/4$ DQPSK modulated signal into the analyzer.

12. The method of claim 10 wherein the identifying and recording step comprises:

controlling the analyzer to sample a user-defined number of zero-crossings;

controlling the analyzer to sample the signal at a user-defined pace.

13. The method of claim 10 wherein the downloading step comprises transferring the recorded time and number of zero-crossings from a memory within the analyzer to a memory within the system processor by way of an interface card built into the system processor.

14. A system for characterizing modulated signals comprising:

a time interval analyzer for receiving a modulated signal and outputting a series of time stamps and cycle stamps indicative of selected zero-crossings of the signal; and a system processor coupled to the time interval analyzer for determining signal-characterizing parameters as a function of the time stamps and cycle stamps.

15. The system of claim 14 further comprising means for downloading the series of time stamp and cycle stamps from the time interval analyzer to the system processor.

16. The system of claim 14 further comprising a system display coupled to the system processor for displaying the signal characterizing parameters determined by the processing section.

17. A system for characterizing modulated signals comprising:

a time interval analyzer for receiving a modulated signal and outputting a series of time stamps and cycle stamps indicative of selected zero-crossings of the signal; and a system processor coupled to the time interval analyzer for determining signal-characterizing parameters as a function of the time stamps and cycle stamps, wherein the system processor comprises a phase/frequency determining section for generating a phase deviation curve as a function of the time stamps and cycle stamps and a processing section coupled to the phase/frequency determining section for determining signal-characterizing parameters as a function of the generated phase deviation curve.

18. The system of claim 17 wherein the processing section comprises:

means for calculating the origin offset of the modulated signal; and means for calculating I/Q mismatch of a phase modulator which generated the modulated signal.

* * * * *